United States Patent [19]

Yoshino et al.

[11] 4,381,146

[45] Apr. 26, 1983

[54] PIEZOELECTRIC APERTURE SIZE CONTROL DEVICE

[75] Inventors: Tsunemi Yoshino, Ibaraki; Hiroshi Iwata, Nara, both of Japan

[73] Assignee: West Electric Co., Ltd., Osaka, Japan

[21] Appl. No.: 272,167

[22] Filed: Jun. 10, 1981

[30] Foreign Application Priority Data

Jun. 17, 1980 [JP] Japan .................................. 55-82650

[51] Int. Cl.³ .............................................. G03B 9/02
[52] U.S. Cl. ................................................. 354/271
[58] Field of Search ............... 352/227, 228, 234, 271

[56] References Cited

U.S. PATENT DOCUMENTS

| | | | |
|---|---|---|---|
| 3,110,824 | 11/1963 | Flanagan | 354/271 |
| 4,162,832 | 7/1979 | Frank et al. | 354/234 |
| 4,198,140 | 4/1980 | Frank et al. | 354/234 |

*Primary Examiner*—Russell E. Adams
*Attorney, Agent, or Firm*—Burgess, Ryan & Wayne

[57] ABSTRACT

A piezoelectric aperture size control device for controlling aperture size consists of an electrically driven aperture-setting mechanism in which a diaphragm ring includes a plurality of aperture-setting blades or leaves and an actuating ring for opening or closing the blades disposed coaxially in a stationary ring leaving an annular space therebetween. A piezoelectric member is slidably disposed in the annular space and made to operably engage the actuating ring to urge the movements thereof in response to proper control signals. The piezoelectric member comprises first and second piezoelectric elements and a third piezoelectric element therebetween. The first and second elements are each disposed to distort and move in a radial direction when excited to become arrested within the said annular space. The third element, when excited, moves rotationally to cause the rotational movements of the first and/or second element when either is not arrested. The excitation voltages to the said elements are each time-related in a manner to cause the said piezoelectric member to move in a pre-determined direction in accordance with a pre-arranged design to change aperture size. It is understood that electrostrictive elements may be used in place of the piezoelectric elements in the operation of the device herein.

4 Claims, 5 Drawing Figures

CAMERA BODY

PIEZOELECTRIC APERTURE SIZE CONTROL DEVICE

BACKGROUND OF THE INVENTION

The present invention relates to an electrically driven aperture-setting device.

Some types of photographic and television cameras have employed an exposure control system of the type in which aperture is varied so as to control the amount of light from an object. In this case, aperture-setting devices are driven by an electric motor or a combination of permanent magnets and an electromagnet. As a result, they are all large in size and consequently not easy to handle. In addition, they generally maintain a predetermined aperture by the balance of magnetic forces. Therefore, if a television camera is mounted on an automotive vehicle, vibrations of the vehicle are transmitted to the camera, so that it becomes extremely difficult to maintain a desired aperture.

SUMMARY OF THE INVENTION

The present invention was made to overcome the above and other problems encountered in the conventional electrically driven aperture-setting device.

The present invention provides an electrically driven aperture-setting device based upon piezoelectric or electrostrictive effect.

It is well known that if a piezoelectric or electrostrictive element is placed in an electric field, it is physically distorted. According to the present invention, distortions in the direction of thickness of an element are used especially for setting and maintaining a desired aperture. The present invention, therefore, uses well-known piezoelectric barium titanate ceramics and zirconium titanate-lead ceramics which are well known to have excellent distortion characteristics and distortions of these ceramics are transmitted through suitable means to, for instance, an aperture-setting blade or leaf control ring so as to set and maintain a desired aperture.

According to one embodiment of the present invention, a diaphragm ring including a plurality of aperture-setting blades and an actuating ring for actuating these blades is disposed in a stationary ring coaxially thereof leaving an annular space therebetween. A driving or actuating means which is connected to the actuating ring is disposed within the annular space for sliding movement along the outside surface of the flange of the diaphragm ring. The driving or actuating means comprises first and second driving means (to be referred to as "actuators" in the description of preferred embodiments of the invention) interconnected to each other by an expansion means. The first and second driving means and the expansion means have piezoelectric or electrostrictive elements which are physically distorted when applied with a voltage. The first and second driving means are adapted to be arrested between the diaphragm ring and the stationary ring when applied with a voltage because their piezoelectric or electrostrictive elements are distorted radially outwardly. Therefore, when voltages are applied to the first and second driving means and the expansion means in a predetermined timed relationship, the driving or actuating means moves step by step along the diaphragm ring, so that the actuating ring is rotated and a desired aperture is set and maintained.

According to another embodiment of the present invention, an aperture is set by a sliding plate which is straightly moved by the driving or actuating means slidably disposed in a straight guide passageway defined by two parallel guide walls.

The above and other objects, effects and features of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
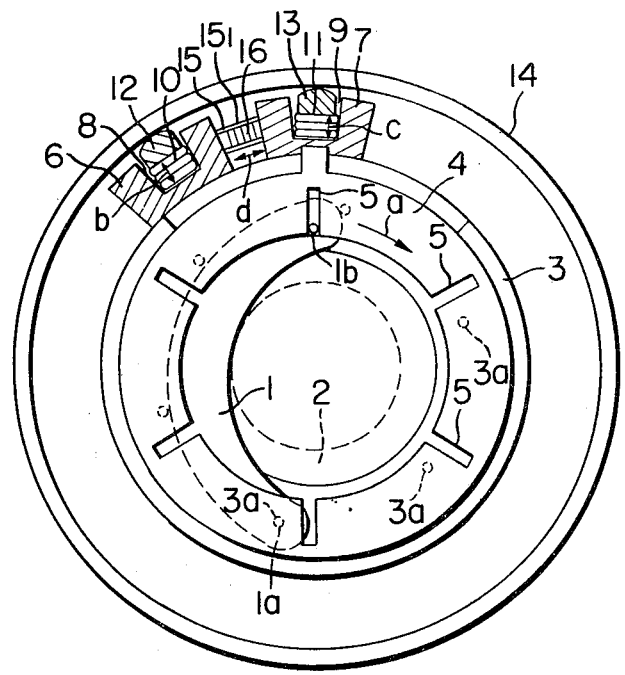
FIG. 1 is a front view of a first embodiment of the present invention.
Figure 2:
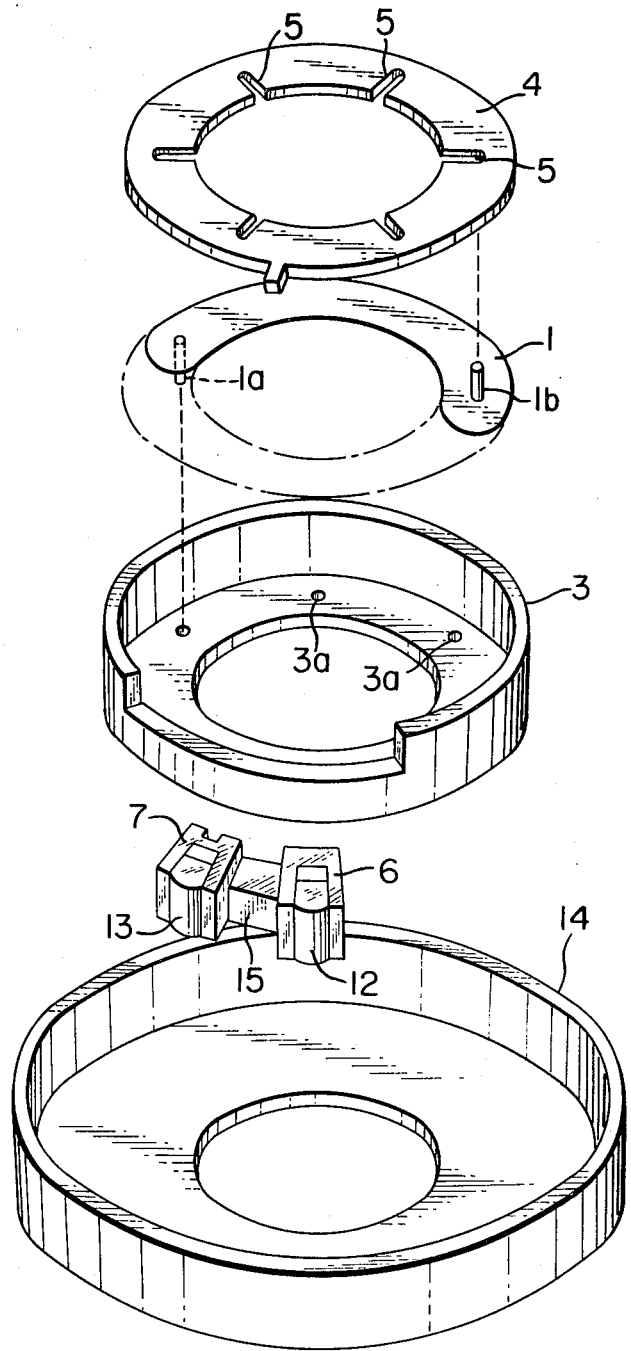
FIG. 2 is an exploded perspective view of the first embodiment.

In FIGS. 1 and 2 is shown an aperture control device incorporating an aperture-setting ring control device in accordance with the present invention. Reference numeral 1 denotes a plurality of aperture-setting blades (only one is shown) which coact with each other so as to set a desired aperture; 1a and 1b, pins extended in the opposite directions from the ends of the blade 1; 3, a stationary ring with a retaining hole 3a for receiving the pin 1a of the blade 1; and 4, an aperture-setting ring formed with guide slots 5 for engagement with the pins 1b of the blades 1 and adapted to rotate in the stationary ring 3 coaxially thereof. The blades 1 and the aperture-setting ring 4 are disposed in the stationary ring 3 in the order named, whereby, the aperture-setting mechanism is provided.

When the aperture-setting ring 4 is rotated in the direction indicated by an arrow a, the blade 1 is caused to swing about the pin 1a in the same direction a while the pin 1b slides along the guide slot 5, whereby, an aperture 2 is closed. That is, the camera lens is stopped down. To uncover the aperture 2, the setting ring 4 is rotated in the opposite direction.

According to the present invention, the aperture-setting ring 4 is rotated in either direction by piezoelectric or electrostrictive effect as will be described in detail below.

Referring still FIGS. 1 and 2, reference numeral 6 denotes a first actuator having a first piezoelectric element 10 and a first arresting member 12 disposed in a recess 8. The first actuator 6 is slidable along the inside wall of the annular flange of a first stationary ring 3. As the first piezoelectric element 10 is energized or deenergized, it extends or returns its initial shape in the radial direction as indicated by a double-pointed arrow b, so that the first arresting member 12 is also caused to radially outwardly or inwardly move. A second actuator 7 is substantially similar in construction to the first actuator 6 and has a second piezoelectric element 11 and a second arresting member 13 disposed in a recess 9. The first and second actuators 6 and 7 are interconnected with each other by a connecting-and-expansion member 15 (to be referred to as "the expansion member" hereinafter for brevity) comprising an elastic main body $15_1$ and a third piezoelectric element 16 which is expandable or deformable in the circumferential direction as indicated by a double-pointed arrow d.

Next, the mode of operation will be described. When only the first piezoelectric element 10 is energized, it is deformed or expanded radially outwardly, so that the first arresting member 12 is pressed against the inner wall surface of the flange of the second stationary ring 14 as shown in FIG. 1. As a result, the first actuator 6 is arrested between the first and second stationary rings 3 and 14.

When the third piezoelectric element 16 is energized next under these conditions, it deforms or expands. Since the first actuator 6 is arrested, the second actuator 7 which is not arrested is moved in the direction a. Thereafter, the second piezoelectric element 11 is energized, so that the second arresting member 13 is caused to move radially outwardly by deformation of the second piezoelectric element 11 and engage with the inner cylindrical wall surface of the flange of the second stationary ring 14. As a result, the second actuator 7 is arrested between the first and second stationary rings 3 and 14.

Next, the first and third piezoelectric elements 10 and 16 are de-energized, so that they return to their initial states or they contract. As a result, the first arresting member 12 is released from the flange of the second stationary ring 14, whereby the first actuator 6 is released. The expansion member 15 returns to its initial state. Since the first actuator 6 is released while the second actuator 7 remains arrested, the first actuator 6 is dragged by the expansion member 15 in the direction a.

As a whole, the first and second actuators 6 and 7 have been displaced in the direction a by a distance equal to the deformation of the third piezoelectric element 16. Since the projection extended radially outwardly from the aperture-setting ring 4 is engaged with a recess formed in the radially inside wall of the second actuator 7 (See FIG. 2), the aperture-setting ring 4 is rotated through an angle corresponding to the displacement of the first and second actuators 6 and 7 in the direction a. As a result, the aperture-setting blades 1 are caused swing about their pins 1a in the manner described previously, so that the aperture 2 is partially closed.

It is apparent that when the above-described crawling or inching cycle is repeated, the aperture-setting ring 4 is rotated step by step in the direction a. Therefore, a desired aperture can be set by using the formations or forces generated by the first, second and third piezoelectric elements 10, 11 and 16. It is apparent that if it is desired to rotate the aperture-setting ring 4 in the direction opposite to the direction a, the above-described steps are reversed.

Figure 3A:
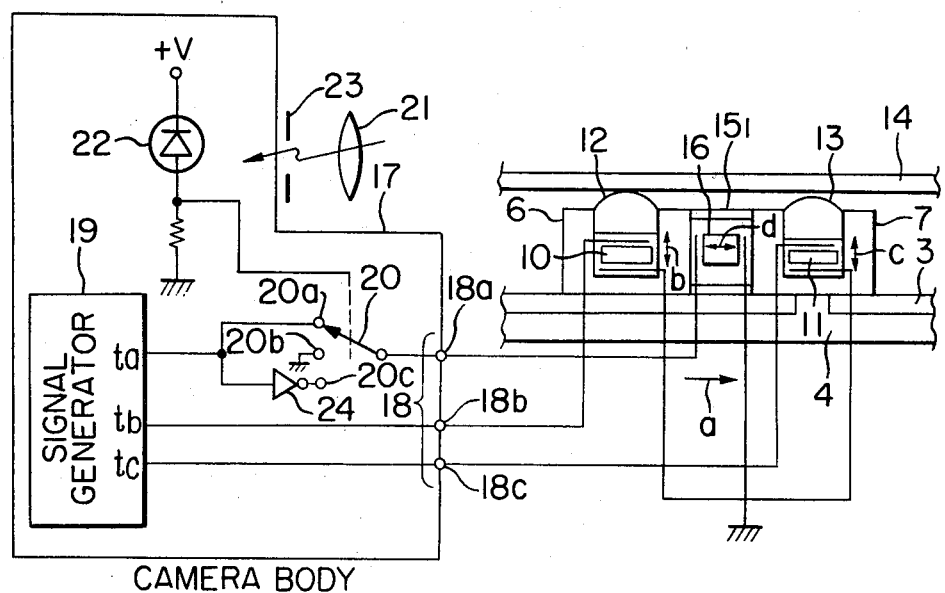
FIG. 3A shows an electric circuit diagram of the first embodiment.
Figure 3B:
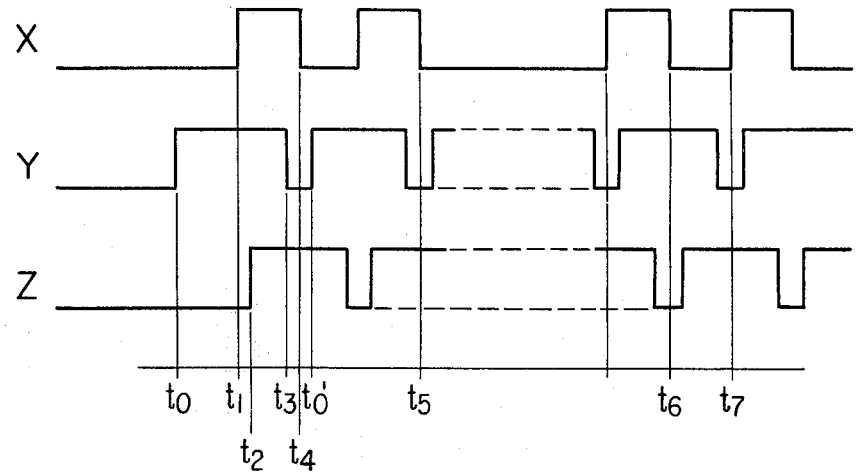
FIG. 3B shows the timing diagram of clock voltage wave forms for operation of the first embodiment.

In FIG. 3A is shown the aperture-setting ring control device together with its associated electronic circuit and in FIG. 3B is shown the timing diagram of the clock voltage wave forms for operation. Reference numeral 17 denotes a camera body; 18a to 18c, contacts mounted on a lens mount; 19, a signal or clock voltage generator for generating the signals or clock voltages as shown in FIG. 3B; 20, a switch for selecting the direction of rotation of the aperture-setting ring 4; 21, a lens; 22, a photosensor adapted to measure the brightness of an object; and 23, the group of aperture-setting blades 1.

The first, second and third piezoelectric elements 10, 11 and 16 have their one terminals connected to the contacts 18b, 18c and 18a, respectively, and the other terminals are grounded. When they are energized or deenergized, they expand or contract in the directions indicated by the double-pointed arrows b, d and c, respectively, as described previously.

The signals or clock voltages generated by the signal generator 19 are applied through the direction-selection switch 20 (which is controlled in response to the output from the photosensor 22) and the contacts 18a, 18b and 18c to the third, first and second piezoelectric elements 16, 10 and 11, respectively. The direction-selection switch 20 is switched so as to control the phase of the control signal to be applied to the third piezoelectric element 16. It is, of course, possible to manually switch the direction-selection switch 20.

Next, the mode of operation will be described in conjunction with the timing diagram as shown in FIG. 3B. It is assumed that each piezoelectric element is distorted or expanded when it is impressed with a high voltage signal.

At $t_0$ the stationary contact 20a of the direction-selection switch 20 is closed and the signal from the terminal $t_b$ of the signal generator 19 rises to a high level as indicated at Y in FIG. 3B. Then the first piezoelectric element 10 is distorted or expanded so that the first arresting member 12 is engaged with the flange of the second stationary ring 14 and consequently the first actuator 6 is arrested between the first and second stationary rings 3 and 14 as described previously. The signals X and Z derived from the terminals $t_a$ and $t_c$ of the signal generator 19 remain at a low level so that the second and third piezoelectric elements 11 and 16 remain undistorted.

At $t_1$ the signal X rises to a high level so that the third piezoelectric element 16 is distorted or expanded. As a result, the second actuator 7 is caused to shift itself in the direction a as described previously and consequently the aperture 2 is stopped down. At $t_2$ the signal Z rises to a high level, so that the second piezoelectric element 11 is distorted or expanded and consequently the second arresting member 13 engages with the flange of the second stationary ring 14. As a result, the second actuator 7 is arrested between the first and second stationary rings 3 and 14.

At $t_3$, the signal Y falls to a low level, so that the first piezoelectric element 10 returns to its initial state and consequently the first arresting member 12 is moved away from the flange of the second stationary ring 14. As a result, the first actuator 6 is released or becomes free to move.

At $t_4$ the signal X falls to a low level, so that the third piezoelectric element 16 returns to its initial state and consequently the compressive force of the expansion member 15 causes the first actuator 6 to move in the direction a.

Thus, one crawling or creeping cycle of the first and second actuators 6 and 7 is completed.

At $t_0'$ the next crawling or creeping cycle is repeated. Repeating this step, the aperture-setting ring 4 is rotated step by step in the direction a.

When an optimum aperture is obtained at $t_5$, the contact 20a is opened while the contact 20b is closed, so that no signal X is transmitted to the third piezoelectric element 16; that is, the signal X remains at a low level. The first and second actuators 6 and 7 remain stationary, so that an optimum aperture is maintained. That is, either of the first or second actuator is arrested between the first and second stationary rings 3 and 14, whereby an optimum aperture is maintained.

If the contact 20c of the direction-selection switch 20 is closed, the signal from the terminal $t_a$ of the signal generator 19 is applied through an inverter 24 to the third piezoelectric element 16 so that the wave form as shown at X in FIG. 3B is inverted. That is, the signal X rises to a high level at $t_1$ when the signal Y is at a high level while the signal Z is at a low level when the aperture-setting ring 4 is rotated in the direction a and the signal falls at $t_4$ when the signal Y is at a low level while the signal Z is at a high level. But when the contact 20c is closed, the signal X falls to a low level at $t_6$ when the signal Y is at a high level while the signal Z is at a low level and the signal X rises at $t_7$ when the signal Y is at a low level while the signal Z is at a high level.

It follows, therefore, that the third piezoelectric element 16 is distorted or expanded when the second actuator 7 is arrested and returns to its normal state when the first actuator 6 is arrested. As a result, the first and second actuators 6 and 7 are moved step by step in the direction opposite to the direction a, whereby the aperture is gradually increased. When an optimum aperture is obtained, the contact 20b of the direction-selection switch 20 is closed again, so that the signal X remains at a low level. In this case, either of the first or second actuator is arrested, so that an optimum aperture may be maintained.

As described above, according to the present invention, the rotation of the aperture-setting ring 4 and hence the rotation of the aperture-setting blades 1 are controlled by physical distortions of piezoelectric or electrostrictive elements. Thus, the aperture-setting ring control device can be made compact in size. In addition, an optimum aperture can be maintained positively because the first and second actuators 6 and 7 are securely arrested between the first and second stationary rings 3 and 14 by frictional engagement. As a result, the aperture-setting ring control device becomes almost immune to vibrations or impacts, whereby it is highly reliable and dependable in operation.

Figure 4:
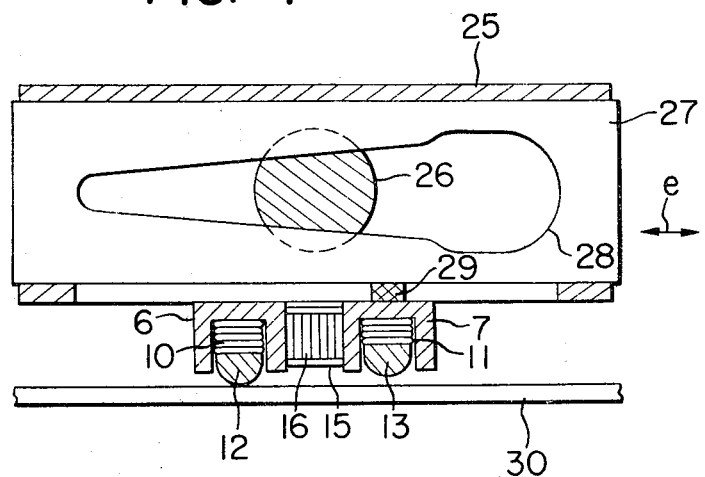
FIG. 4 is a front view of a second embodiment of the present invention.

In FIG. 4 is shown another embodiment of the present invention. An aperture plate 25 which is held stationary has an opening 26 which defines a maximum aperture. A sliding plate 27 with a wedge-shaped opening or slot 28 is mounted on the aperture plate 25 for slidable movement in either direction as indicated by a double-pointed arrow e. Therefore, the overlapping portion (hatched area in FIG. 4) of the openings 26 and 28 defines an aperture.

The sliding plate 27 is moved by the first and second actuators 6 and 7 in a manner substantially similar to that described above in conjunction with the first embodiment. The sliding plate 27 and the second actuator 7 is interconnected to each other by a connecting member 29. The first and second actuators 6 and 7 are arrested between the aperture plate 25 and a guide wall 30 disposed in parallel therewith and spaced apart therefrom by a suitable distance when the first and second arresting members 12 and 13 engage with the guide wall 30.

What is claimed is:
1. A piezoelectric aperture size control device responsive to control signals comprising:
   (a) first support means having an opening which defines a maximum aperture size,
   (b) movable aperture-setting means on said first support means and movable relative thereto so as to close the opening thereof, thereby setting a desired aperture size,
   (c) control means in proximity to said movable aperture-setting means for controlling the movements thereof,
   (d) second support means for supporting said first support means and aperture-setting means including the said control means,
   (e) first driving means slidably disposed between said first and second support means and adapted to respond to a first control signal so as to become arrested therebetween,
   (f) second driving means connected to said control means and slidably disposed between said first and second support means and adapted to respond to a second control signal so as to become arrested therebetween,
   (g) connection-and-expansion driving means interconnecting said first and second driving means and adapted to respond to a third control signal to expand and contract in response thereto to move the said first and second driving means when neither is arrested,
   the said control signals being time related to cause the said driving means to move in a pre-determined direction so as to control the aperture size accordingly.

2. A piezoelectric aperture size control device according to claim 1, wherein said first and second driving means further comprises a piezoelectric element connected to arresting members to permit said members to engage the stationary support means and become arrested thereto in response to the said control signals.

3. A piezoelectric aperture size control device according to claim 1, wherein said connection-and-expansion means further comprises a piezoelectric element mounted thereon and disposed to expand and contract in a rotational direction in response to the said control signals.

4. A piezoelectric aperture size control device according to claim 2 or 3, wherein said piezoelectric elements are replaced by electrorestrictive elements.

* * * * *